United States Patent [19]
Kaneko et al.

[11] 3,847,616
[45] Nov. 12, 1974

[54] PROCESS AND APPARATUS FOR GELLING A SOL-FORM SUBSTANCE FOR A PHOTOGRAPHIC LIGHT-SENSITIVE ELEMENT AND FOR MELTING SAME

[75] Inventors: Shiro Kaneko; Sakae Masuda; Motohiro Ujihara; Yosuke Uchida, all of Minami Ashigara-machi, Japan

[73] Assignee: Fuji Photo Film Co., Ltd., Minami Ashigara-shi, Kanagawa, Japan

[22] Filed: Feb. 8, 1972

[21] Appl. No.: 224,438

[30] Foreign Application Priority Data
Feb. 8, 1971 Japan.................................. 46-5060

[52] U.S. Cl.......... 96/94 R, 159/DIG. 16, 159/28 D
[51] Int. Cl............................ G03c 1/02, B01d 1/04
[58] Field of Search........................ 96/94 R, 114.7; 159/DIG. 16, 28 D

[56] References Cited
UNITED STATES PATENTS
2,618,556  11/1952  Hewitson et al............... 96/114.7 X
3,396,027  8/1968  McFall et al...................... 96/114.7

Primary Examiner—Ronald H. Smith
Assistant Examiner—Alfonso T. Suro Pico
Attorney, Agent, or Firm—Sughrue, Rothwell, Mion, Zinn & Macpeak

[57] ABSTRACT

A process for gelling a sol-form substance and melting same which comprises the steps of supporting a gelled substance in a lower portion of a closed vessel, providing a hurdle-shaped or net-like heat transmitting device so as to melt said gelled substance from thereunder in direct contact with said gelled substance, adjusting the degree of vacuum in said closed vessel so as to obtain a required cooling temperature in the case of cooling, simultaneously supplying a cooling medium to said heat transmitting device, feeding and sprinkling a sol-form substance into said closed vessel thereby to cool and gel said sol-form substance so as to accumulate on said heat transmitting device, thereafter supplying a heating medium to said heat transmitting device, the temperature and quantity of heat of said heating medium being adjusted so as to obtain a required melting temperature and melting rate of the gelled substance in case of melting, causing the melting of said gelled substance to continue in contact with said heat transmitting device without stagnating the thus melted gelled substance, and simultaneously taking out the thus melted gelled substance from the bottom portion of said closed vessel.

An apparatus for producing a photographic light-sensitive element which comprises means for feeding and sprinkling a sol-form substance onto a heat transmitting means in the interior of a closed vessel provided with independent temperature control jackets, said closed vessel being connected with vacuum producing means, the upper portion and lower portion of said closed vessel separated by said heat transmitting means being connected by an equivalent pressure pipe and said heat transmitting device and said jackets being connected to a heating source and a cooling source by valving means, respectively.

8 Claims, 3 Drawing Figures

PROCESS AND APPARATUS FOR GELLING A SOL-FORM SUBSTANCE FOR A PHOTOGRAPHIC LIGHT-SENSITIVE ELEMENT AND FOR MELTING SAME

BACKGROUND OF THE INVENTION

1. Field of the Invention

This invention relates to a process for cooling a sol-form substance to effect gelation thereof and heating and melting the resulting gel-form substance as occasion demands and to an apparatus for effecting these process steps. Furthermore, this invention relates to a process in which a sol-form substance in the production process of photographic light-sensitive elements is caused to rapidly cool to attain the gelation thereof, to preserve the resulting gel-form substance and, as occasion demands, the gel-form substance is caused to heat and melt in the same vessel and to an apparatus for effecting the above-mentioned process steps.

2. Description of the Prior Art

In the production of photographic light-sensitive elements, a photographic emulsion, matting agent, and the other emulsified substances are prepared and then, they are maintained at a low temperature by cooling them, while it is necessary to melt them again in the case when they are applied on a supporting material.

In such cases, a process such that the above-mentioned emulsified substances are prepared, then, the resulting substances are placed in a dish provided with a cooling jacket to effect gelation thereof, further, the thus gelled substances are transferred into a storage vessel, and the vessel is preserved in a refrigerating chamber is known; alternatively after preparing the above-mentioned substances, they are placed in a storage vessel as they are, and the vessel is preserved in a refrigerating chamber. On the other hand, in the case when the above-mentioned substances are then heated and melted, they are taken out from the refrigerating chamber, the gelled substances are transferred from the storage vessel to the tank provided with a heating jacket, and the gelled substances are stirred and melted while heating them has been heretofore principally adopted. In the foregoing cases, however, much labor and many installations are required for carrying out various works in that the above-mentioned emulsified substances are placed in a cooling dish, the substances are maintained in a storage vessel, the storage vessel is taken in and out from a refrigerating chamber, and the substances are transferred from the storage vessel to a melting device, and furthermore, a refrigerating chamber or the like for preserving the storage vessel is also required.

Moreover, since the above-mentioned emulsified substances are liable to receive sequential changes in quality by heat, it is required to cool and gel substances within a comparatively short period after preparing them, and in the case when the gelled substances are melted, it is necessary to heat and melt a required amount of the gelled substances in a short period. However, in the conventional process mentioned above, there is the disadvantage of a risk of producing deterioration in quality of the substances in either the cooling or melting process.

SUMMARY OF THE INVENTION

In accordance with the foregoing, it is a primary object of this invention to provide an improved process by which a sol-form photographic light-sensitive element is cooled and gelled in the same vessel for a short period thereby to preserve it at a low temperature as it is, while the thus gelled light-sensitive element is melted in accordance with desired requirements, the melting rate can be adjusted in response to a required amount of the melted element, whereby the transferring step of the gelled element from a storage vessel can be omitted, and futhermore, the area required for apparatus for embodying this process can be decreased.

Another object of this invention is to provide apparatus capable of effecting the process in accordance with the foregoing primary object of this invention.

The nature of the invention will be more clearly understood by reference to the following detailed description, the appended claims, and the several views illustrated in the accompanying drawings.

BRIEF DESCRIPTION OF THE DRAWINGS

In the accompanying drawings which illustrate one embodiment of the invention.

DESCRIPTION OF THE PREFERRED EMBODIMENTS

In the following, one embodiment of the present invention will be fully described in connection with the accompanying drawings.

Figure 1:
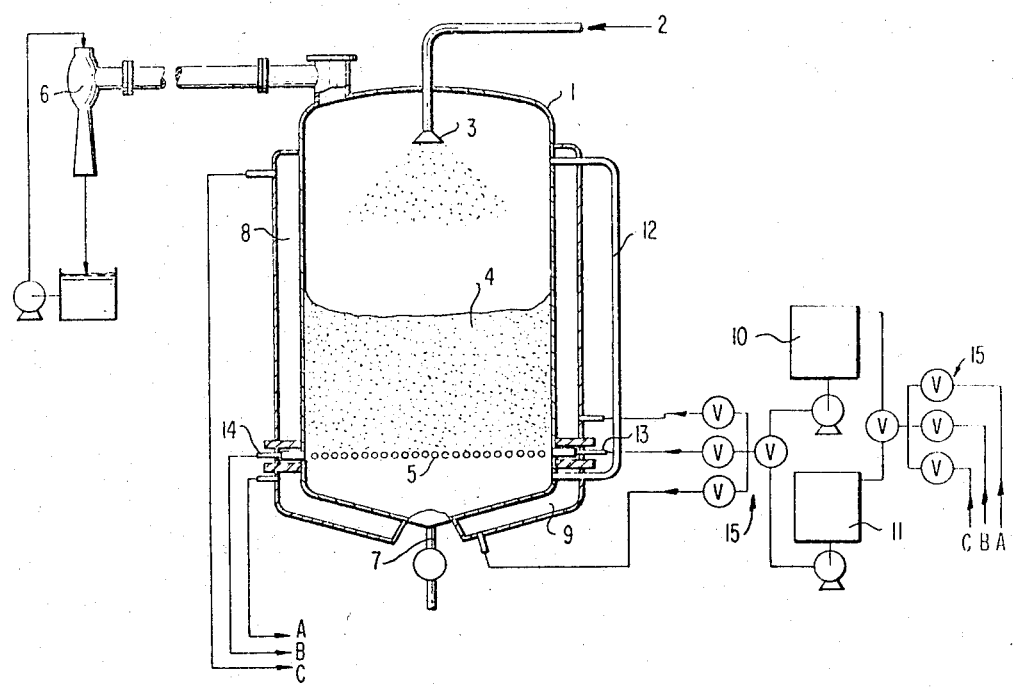
FIG. 1 is a schematic view for explaining the apparatus employed in the present invention.

In FIG. 1, reference numeral 1 designates the closed vessel main body, 2 a sol-form substance to be gelled, 3 a device for feeding and sprinkling the sol-form substance, 4 a gelled substance from said sol-form substance (hereinafter referred to simply as "gelled substance"), and 5 the heat transmitting device, respectively. The vessel main body is connected to a vacuum producing device 6 being provided on the outside of the vessel, at the top portion of the vessel main body. The bottom portion of the vessel main body 1 has an exhaust port 7 for the melted substance.

Furthermore, the vessel main body 1 is divided by the heat transmitting device 5 provided in the lower portion of the vessel into upper and lower portions, and they have independent jackets 8 and 9, respectively. Both of these jackets 8 and 9 are connected to a heating source 10 and cooling source 11, respectively, and both sources are provided on the outside of the vessel main body. The upper and lower portions of the vessel main body 1 are connected through an equivalent pressure pipe 12. The device 3 for feeding and sprinkling sol-form substance forms a watering pot in which a perforated plate is equipped on the extreme end of a pipe so as to form the sol-form substance 2 into liquid drops and to sprinkle them uniformly towards the heat transmitting device 5. The heat transmitting device 5 has an identical extent of area as that of the cross section of the vessel main body 1, and the heat transmitting device 5 is connected to the heating source 10 and cooling source 11 being provided in the outside of the vessel through inlets 13 and outlets 14 for cooling and heating medium, respectively.

Figure 2:
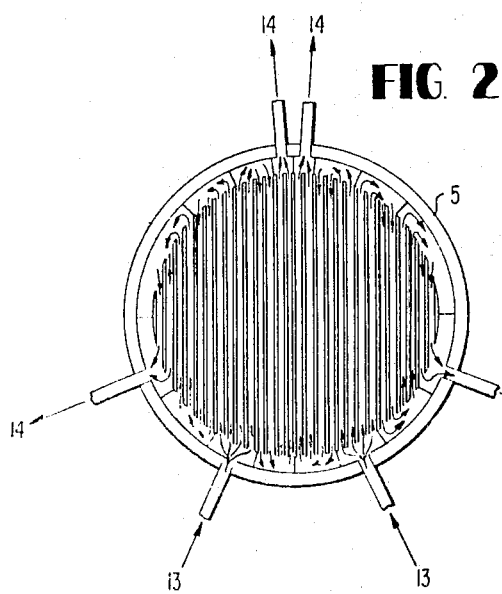
FIG. 2 is a planar view showing a heat transmitting device 5 installed on the inside of a closed vessel main body 1.

Referring further to FIG. 2, the heat transmitting device 5 consists of a group of hurdle-shaped heat transmitting pipes which are obtained by arranging the pipes at equal intervals as narrowly as possible and by collecting certain numbers of both ends of the heat transmitting pipes and connecting them. As a result, the velocity of flow of the heat transmitting medium flowing through the inside of all the heat transmitting pipes becomes substantially equal and substantially uniform heat transmission can be attained on the heat transmitting pipes. FIG. 2 illustrates the shape or construction of one example of the heat transmitting device in which every two heat transmitting pipes are connected with each other as a pair of watercourses as they are arranged, and said heat transmitting device has two inlets 13 for heat transmitting medium and four outlets 14 for heat transmitting medium, respectively.

In FIG. 1, the heating source 10 and cooling source 11 are connected by piping to the heat transmitting device 5, and jackets 8, 9, respectively, but the cooling medium or heating medium can be separately supplied to the heat transmitting device 5, and the jackets 8, 9 by operating a group of valves 15 provided in the pipe arrangement, whereby the supply of the medium can be also stopped. Furthermore, the heating source 10 and cooling source 11 required for the apparatus of the present invention are provided in accordance with known art with means by which temperature can be suitably adjusted and further, the vacuum producing device 6 is also provided by a publicly known means by which degree of vacuum can be suitably adjusted.

The apparatus according to the present invention is constructed as mentioned above and this apparatus is operated as described hereinbelow. That is, in the apparatus shown in FIG. 1, in the case when the sol-form substance is cooled, first of all, the vessel main body 1 is closed to the outside, and the vacuum producing device 6 is operated to thereby evacuate the inside of the vessel main body 1. In this case, it is required that the pressure of the inside of the vessel main body 1 be adjusted to it at the most equal to or below the vapor pressure of water which equilibrates at the temperature at which the sol-form substance is to be cooled.

Next, a cooling medium is supplied to the heat transmitting device 5 and the jackets 8, 9, respectively, by the operation of the group of valves 15. In this case, the temperature of the cooling medium is adjusted to be equal to the temperature at which the sol-form substance is to be cooled. After both the degree of vacuum of the inside of the vessel main body 1 and the temperature of the cooling medium reach constant values, respectively, the sol-form substance 2 is fed to the vessel main body through the feeding and sprinkling device 3 at a constant flow rate. In this case, the sol-form substance 2 sprinkled inside of the vessel main body 1 in the form of liquid drops is exposed to vacuum conditions, and since the temperature of the sol-form substance 2 to be fed is naturally higher than the boiling point of water under this vacuum condition, the water contained in the sol-form substance 2 is rapidly evaporated. Obviously, since the vessel main body 1 is also thermally protected by the jackets 8 and 9 from the outside of the vessel, there is a possibility of absorbing heat by the cooling medium flowing through the jackets 8 and 9, but heat is never supplied. Accordingly, to the sol-form substance 2 sprinkled towards the inside of the vessel main body 1, heat is not supplied from the outside thereof, so that self evaporation is caused of the moisture contained in the sol-form substance, and the latent heat of vaporization in this case appears as the sensible heat change of the sol-form substance 2. Thus, quick cooling of the sol-form substance 2 is carried out, and in the case when this operation is ideally carried out, it is possible to lower the temperature of the sol-form substance 2 in an instant to the temperature of water, the saturated vapor pressure of which is the pressure of the inside of the vessel main body 1. The sol-form substance 2 is naturally gelled by this cooling operation in response to its gelation point. Accordingly, the sol-form substance 2 sprinkled in the inside of the vessel main body 1 gels during its fall down towards the heat transmitting device 5, or the sol-form substance 2 completes gelation thereof when the substance reaches the heat transmitting device 5 in which the cooling medium is circulated. At the beginning of feeding the sol-form substance 2, there is a case in which some of liquid drops of the sol-form substance 2 pass through spaces between the heat transmitting pipes of the heat transmitting device 5, towards the bottom portion of the vessel main body 1, but the sol-form substance 2 gradually accumulated on the heat transmitting device 5 fills the spaces and gels to close them rapidly. Thereafter, the sol-form substance 2 accumulates on or above the heat transmitting device 5 and changes into the gelled substance 4 without passing through spaces of the heat transmitting device 5. After the feeding and gelation of the sol-form substance 2 by cooling are completed, even when the pressure in the vessel main body 1 is returned to atmospheric pressure, the gelled substance 4 can be preserved in its cooling state by circulating a cooled medium through the jackets 8 and 9.

Thereafter, when it is required to employ the gelled substance 4 by melting, first of all, the outer surface of the gelled substance 4 contacting the inner surface of the vessel main body 1 is made to heat and melt very slightly by supplying a heating medium to the jacket 8 for a short time through the operation of the group of valves 15, whereby the outer surface of the gelled substance 4 is released from the inner wall surface of the vessel main body 1.

Next, heating medium is supplied to the heat transmitting device 5 by operating the group of valves 15, and portions of the gelled substance 4 contacting the group of the heat transmitting pipes of the heat transmitting device 5 are heated gradually to be melted; as a result, the thus melted substance flows down to the bottom portion of the vessel main body 1 through the spaces of the group of heat transmitting pipes. Thus, a renewed surface of the gelled substance 4 contacts always with the heat transmitting device 5 thereby to effect the continuous melting of the gelled substance from its lower portion. The resulting melted liquid obtained by melting the gelled substance 4 and accumulated in the bottom portion of the vessel main body 1 is continuously taken out through the exhaust port 7 to the outside of the vessel main body 1.

In the invention of this application, in the case of melting the gelled substance 4, the temperature or flow rate of the heating medium may be changed in accordance with the required amount of the melted substance to adjust the melting rate of the gelled substance and further, an intermittent melting can be suitably carried out by supplying and stopping the heating medium.

Moreover, the supply of the heating medium can be stopped to interrupt melting of the gelled substance, and again, the cooling medium supplied to the jackets 8, 9 and the heat transmitting device 5, whereby the cooling preservation of the gelled substance 4 can be again carried out.

Figure 3:
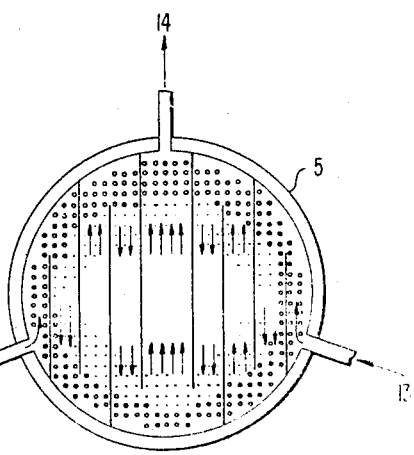
FIG. 3 is a planar view showing another example of the heat transmitting device 5 of FIG. 2.

Hereinabove one embodiment of the process and apparatus of the present invention was explained in connection with the accompanying drawings, but it is to be noted that this is only one example and the content of the invention is not limited thereto. That is, the construction of the heat transmitting device 5 is not limited to that in which the heat transmitting pipes are parallelly arranged as shown in FIG. 2. A flat plate-form in which a heat transmitting medium is flowable and which has a large number of through-hole portions through which a melted liquid of the gelled substance can flow down from the top surface of the heat transmitting device to the bottom portion of the vessel main body may be also employed. In this case, it is better to make each space of through-hole portions as narrow as possible in order to avoid the dropping of the gelled substance. FIG. 3 illustrates an example of the heat transmitting device having a flat plate-form construction and a large number of through-hole portions of cylindrical shape. Furthermore, in this invention, a liquid such as water or a vapor such as steam may be employed for a heated transmitting medium. In the practice of the present invention, one of the purposes of the process and apparatus of this invention resides in gelation of the sol-form substance in the case of cooling the sol-form substance. In a high temperature range prior to the gelation, the cooling function may be partially taken over by providing a conventional heat exchanger other than the apparatus according to the present invention on the way to the feeding pipe for the sol-form substance.

Although there is caused a weight change of the sol-form substance, in other words, concentration of the sol-form substance due to the evaporation of water contained therein in the case when the sol-form substance is cooled and gelled according to the process of this invention, the latent heat of vaporization of water is very remarkable in comparison with the transferring quantity of heat per unit weight of the sol-form substance due to the temperature reduction of the sol-form substance, that is, the sensible heat change in a range ordinarily directed. Accordingly, the quantity of water to be evaporated from the sol-form substance is actually very small. The weight loss of the sol-form substance due to the evaporation of water in the case where the ranges of the temperature reduction to be directed are 20°C. and 30°C. are merely values of 3.5% and 5%, respectively, so that the influence with respect to the quality of the sol-form substance of the evaporation of water is substantially negligible. Any shortage of water may be also be compensated by adding water in the succeeding process steps as occasion demands.

Furthermore, with respect to the apparatus of this invention, it is required to design the heat transmitting area of the heat transmitting device, and to design the vessel main body in accordance with the required rate of melting the gelled substance. In the case where the capacity for the processing is insufficient by one apparatus of the present invention or where blending of two or more gelled substances is required, two or more apparatuses may be parallely provided in response to this requirement; and these apparatuses are simultaneously operated to effect the melting of the gelled substances (or substance), whereby the object of the present invention can be attained.

In the present invention, it is possible that the sol-form substance can be cooled and gelled in one vessel for a short period, and the thus gelled substance is preserved at a low temperature as it is, whereas, the gelled substance is melted as occasion demands, and the thus melted liquid taken out in the process steps for producing a photographic light-sensitive element as fully described hereinabove. Accordingly, in the present invention, the transferring operation of the sol-form substance or the gelled substance from its vessel heretofore required and the labors for working accompanied with the transferring operation become unnecessary, the time for cooling the sol-form substance can be reduced, and further, the time for transporting the melted liquid to the succeeding process step can be also reduced. Furthermore, a storage container necessary for the conveyance heretofore required, a refrigerating chamber therefor, a melting tank for melting the gelled substance, and an agitating device are not required in the present invention and therefore, the area for establishing the apparatus of the present invention can be reduced as compared with the areas for conventional cooling and melting devices. Moreover, in the process of the present invention, since a movable portion is not required for the apparatus, the apparatus has the advantages that the construction thereof is simple and its operation very easy. Furthermore, the gelation of the sol-form substance by cooling can be quickly carried out, and a mechanism for adjusting the melting rate of the gelled substance in accordance with the necessary results may be additionally provided in the present invention. Therefore, the process and apparatus according to the present invention are suitable either for the gelation by cooling of a sol-form substance employed for photographic light-sensitive element such as a photographic emulsion or the like which is liable to receive a sequential quality change by heat or for the melting of the gelled substance of the photographic emulsion or the like.

Next, the invention will be more specifically described in connection with the following example.

EXAMPLE

To a stainless steel closed tank having a diameter of 55 cm and a height of 150 cm and constructed as shown in FIG, 1, a heat transmitting device as shown in FIG. 2 being obtained by arranging stainless steel pipes each having a diameter of 1 inch at intervals of 3 mm was provided at the position of a height of 30 cm from the botton of said tank, and a vacuum producing device consisting of a water jet condenser provided at the outside of the tank was combined with the tank at the top portion thereof, thereby to obtain the apparatus according to the present invention. In this apparatus, after water having a temperature of 15°C. was supplied to the heat transmitting device and the inside pressure of the tank was reduced, 100 kg of a photographic emulsion for X-rays prepared by an ordinary method was fed to the tank at a temperature of 35°C. and as a result, the following results were always obtained.

| Experimental No. | Pressure in Tank (mmHg) | Feeding rate of Emulsion (l/min) | Resultant temperature of cooled emulsion (°C)* |
|---|---|---|---|
| (1) | 13 | 5 | 16.5 |
| (2) | 12 | 8 | 17.5 |
| (3) | 9 | 10 | 15.0 |

*In the tank immediately after feeding the emulsion.

After completion of the cooling operation, the lower portion of the heat transmitting device and the bottom portion of the tank main body were observed, as a result of which it was found that the photographic emulsion was gelled and deposited on and over the heat transmitting device; the quantity of the emulsion which had fallen down through the spaces of the heat transmitting device was very small.

The pressure of the closed tank was returned to atmospheric pressure, and then the emulsion could be preserved in its cooling state by circulating the above-mentioned water through the heat transmitting device and the tank jackets. Next, hot water was supplied to an upper jacket of the closed tank for about 1 minute, then, hot water was supplied to the heat transmitting device at the following conditions, and as a result, the gelled emulsion as described above was continuously and substantially uniformly melted and the following results were obtained.

| Experimental No. | Temp. at Feeding Hot water (°C.) | Supplied ]4ount 6f Hot water (l/min) | Melting Rate 6f emulsion (l/min) |
|---|---|---|---|
| (1) | 43 | 20 | 1.8 |
| (2) | 45 | 20 | 2.1 |
| (3) | 45 | 30 | 2.3 |

The emulsion melted by the above-mentioned process was applied on a base material for a photographic light-sensitive element, dried, and then the resulting photographic film was subjected to a test with respect to its photographic properties, and as a result, normal results could be observed.

What we claim is:

1. A process for producing a gel-form of a photographic silver halide emulsion from a sol-form of said emulsion and for melting said gel-form of said emulsion which comprises the steps of:
    a. providing a hurdle-shaped or net-like heat transmitting device capable of supporting said gel-form of said emulsion at the lower portion of a closed vessel;
    b. supplying a cooling medium to said heat transmitting device;
    c. reducing the pressure in said vessel to at least the vapor pressure of water at the temperature at which said sol-form of said emulsion is to be cooled to form said gel-form of said emulsion;
    d. feeding in droplet form said sol-form of said emulsion into said closed vessel thereby to cool and gel said sol-form of said emulsion so as to accumulate on and be supported by said heat transmitting device; and thereafter,
    e. supplying a heating medium to said heat transmitting device, the temperature and quantity of said heating medium being adjusted so as to obtain a required melting temperature and melting rate of said gel-form of said emulsion, thereby causing said gel-form of said emulsion to melt and flow downwardly through said heat transmitting device, and
    f. taking out said melted gel-form of said emulsion from the bottom portion of said closed vessel.

2. The process of claim 1, wherein said pressure is reduced in step (c) to the range 9 mmHg to 15 mmHg.

3. The process of claim 1, wherein in step (e) said gel-form of said emulsion is heated to from 35° to 45°C.

4. The process of claim 1, wherein the walls of said closed vessel are cooled during steps (b), (c) and (d).

5. The process of claim 1, wherein just prior to step (e) heat is supplied to the walls of said closed vessel in an amount sufficient to melt slightly said gel-form of said emulsion adjacent said walls.

6. The process of claim 1, wherein the temperature of said sol-form of said emulsion when it is fed into the closed vessel in step (d) is about 35°C.

7. The process of claim 1, wherein the gel-form of said emulsion formed in step (d) is cooled to a temperature of about 15° to 17.5°C.

8. The process of claim 1, wherein the pressure in said closed vessel is raised to atmospheric pressure just prior to step (e).

* * * * *